(12) United States Patent
Scheyer

(10) Patent No.: US 7,784,193 B2
(45) Date of Patent: Aug. 31, 2010

(54) AIRLESSLY SEALED VIAL

(75) Inventor: Wolfgang Scheyer, Gotzis (AT)

(73) Assignee: Sola-Messwerkzeuge GmbH, Gotzis (AU)

( * ) Notice: Subject to any disclaimer, the term of this patent is extended or adjusted under 35 U.S.C. 154(b) by 35 days.

(21) Appl. No.: 12/252,014

(22) Filed: Oct. 15, 2008

(65) Prior Publication Data

US 2009/0151179 A1  Jun. 18, 2009

(30) Foreign Application Priority Data

Oct. 17, 2007  (EP) .................................. 07 020 284

(51) Int. Cl.
*G01C 9/26* (2006.01)
(52) U.S. Cl. ........................... 33/380; 33/379; 215/271
(58) Field of Classification Search ................ 33/377, 33/379, 380, 383; 277/644, 650; 215/271
See application file for complete search history.

(56) References Cited

U.S. PATENT DOCUMENTS

| | | | |
|---|---|---|---|
| 1,885,428 A | 11/1932 | Gallasch | |
| 2,235,314 A * | 3/1941 | Diggins et al. | 33/380 |
| 2,406,898 A * | 9/1946 | Palmer | 277/650 |
| 2,688,995 A * | 9/1954 | Wagoner | 215/271 |
| 3,281,947 A | 11/1966 | McDowell | |
| 4,265,364 A | 5/1981 | Baba | |
| 5,111,039 A | 5/1992 | Froning | |
| 5,947,311 A * | 9/1999 | Gregory | 215/271 |
| 6,880,273 B2 * | 4/2005 | Lo | 215/271 |
| 2003/0009893 A1 * | 1/2003 | Jacoff | 33/379 |
| 2004/0143980 A1 * | 7/2004 | Jacoff | 33/379 |

FOREIGN PATENT DOCUMENTS

| | | |
|---|---|---|
| GB | 456272 | 11/1936 |
| GB | 2222686 A | 3/1990 |
| WO | WO 2004/044524 A2 | 5/2004 |

* cited by examiner

*Primary Examiner*—G. Bradley Bennett
(74) *Attorney, Agent, or Firm*—Robert L. Stearns; Dickinson Wright, PLLC

(57) ABSTRACT

An airlessly sealed vial includes an interior cavity filled with at least one liquid. At least one sealing cap is provided, which seals closed an opening into the interior cavity. The vial also includes means associated with the sealing cap and/or the interior cavity for changing the volumetric liquid containing capacity of the interior cavity in accordance with volumetric changes in the liquid contained in the vial. The means may be a moveable or flexible wall at least partly defining the interior cavity and/or a compressible member included in the interior cavity.

19 Claims, 2 Drawing Sheets

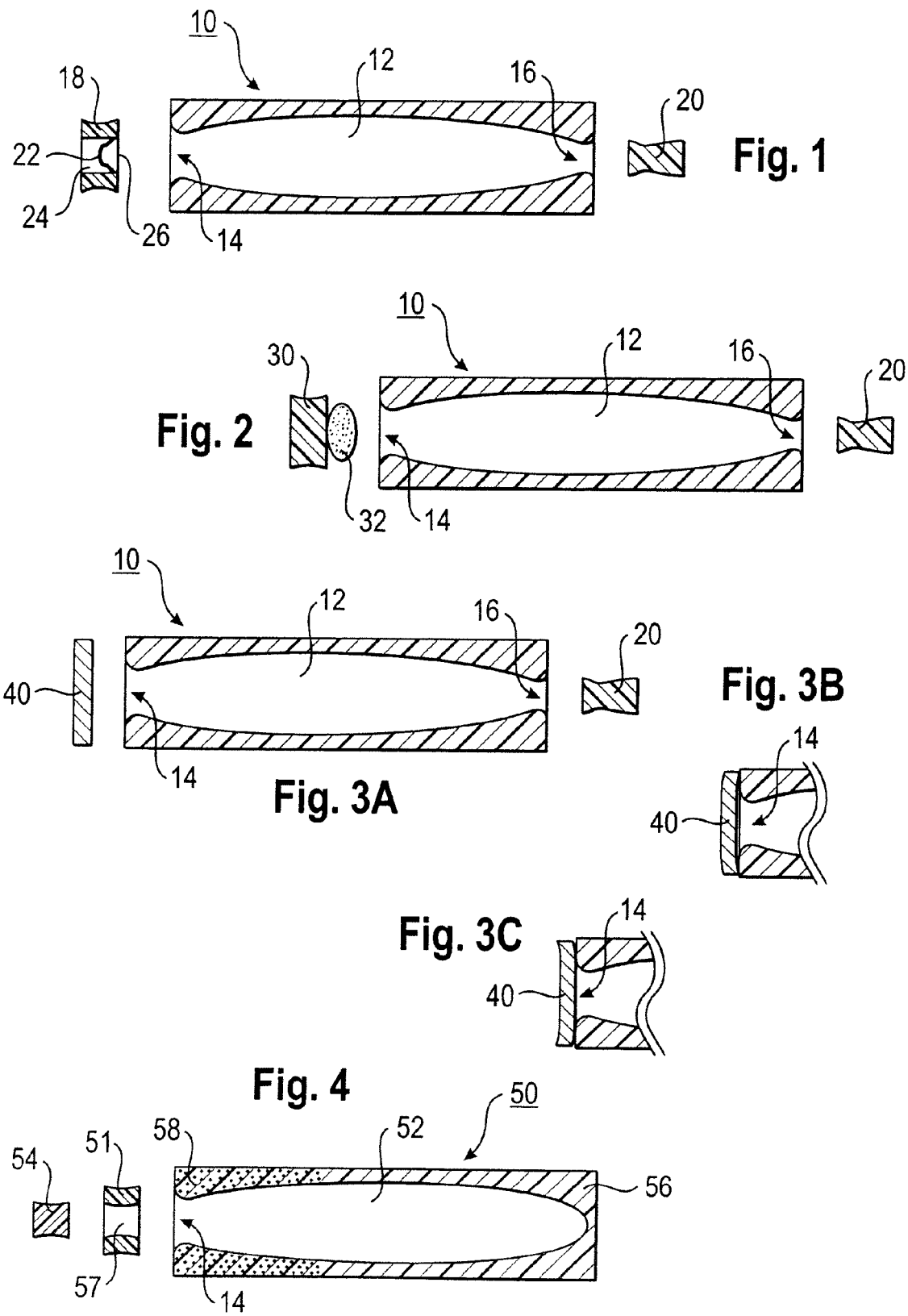

AIRLESSLY SEALED VIAL

This application claims priority to European Patent Application Serial No. 07 020 284.1, filed Oct. 17, 2007, and is incorporated herein by reference.

TECHNICAL FIELD

The present invention is concerned with an airlessly sealed vial, which contains at least one liquid.

BACKGROUND OF THE INVENTION

Vials are small sealable vessels commonly used as containers for liquids, for example liquid drugs, or liquid medical or biological samples. A vial may be transparent enough to allow the liquids contained therein to be viewed from the outside. A vial may be made of a brittle material, such as glass. Vials made of plastic materials are also known.

A spirit level vial is known in the art that is almost completely filled with a liquid and includes a small bubble of gas, air for example. The spirit level vial can be mounted to a spirit level base. One of the vial or base can include a mark positioned so that when the base is "level", the bubble will be aligned with the mark. Such vials are not generally subject to high internal pressures.

WO 2004/044524 offered an alternative to this traditional spirit level vial. In this document, a spirit-level is provided that comprises a transparent spirit-level vial, essentially completely filled by a first liquid medium and further contains a globule of a second liquid. The globule can move through the medium in response to changes in the spatial orientation of the vial. The two liquids are airlessly sealed in the vial.

WO 2004/044524 teaches that by careful selection of the type and colour of the second liquid used to form the globule, it is possible to obtain improved visual contrast as compared to with an air bubble, which was traditionally used instead of the globule. In particular, the first and second liquids should have distinctly different densities, e.g. different by at least 0.3 g/cc.

The spirit level of WO 2004/044524 includes a base element to which one of the spirit level vials is mounted. One or more markings are provided on the vial or the base element. The markings are calibrated so as to indicate that a surface upon which the base element rests is level (e.g. horizontal or vertical) when the liquid globule is aligned with the one or more markings.

As the liquids are hermetically sealed in the vial, pressure inside the vial will vary due to temperature changes (i.e. due to thermal expansion). The pressure increase in the vial due to thermal expansion can be calculated as follows, using a nominal example of water as the liquid contained in the vial. The compressibility of water at 20° C. is about $4.5*10^{-5}$ bar$^{-1}$. The thermal expansivity of water is about $0.2*10^{-3}$K$^{-1}$. The ratio of these values leads to the proportion between pressure and temperature change, which is 4.44 bar/K. Thus, if the vial is subjected to a temperature change from 15° C. to 55° C. the pressure inside the sealed vial can reach 180 bar, which would cause many prior art vials to break.

It can thus be seen that the increase in pressure in the airlessly sealed spirit level vial of WO 2004/044524 due to an increase in temperature could be problematic. This problem is applicable to airlessly sealed vials in general and is not just limited to airlessly sealed spirit level vials. Pressure changes in the liquid will put strain on the vial, which can lead to breakage of the vial or put certain constraints on the strength of the material used to make the vial.

There is therefore a need to provide an airlessly sealed vial which can overcome the above problems and this is an object of the present invention.

Further objects and advantages of the vial described herein will become apparent from the following description.

SUMMARY OF THE INVENTION

The present invention provides, in one aspect, an airlessly sealed vial, comprising:
  an interior cavity filled with at least one liquid;
  at least one sealing cap sealingly closing an opening into the interior cavity; and
  means associated with the sealing cap and/or the interior cavity for changing the volumetric liquid containing capacity of the interior cavity in accordance with volume changes in the liquid contained in the vial.

In use, the interior cavity changes its volume in response to any temperature changes, rather than significant pressure changes in the liquid taking place. Thus, any strain that would otherwise have been placed on the vial due to temperature change is reduced.

The invention is defined by the independent claims. Preferred embodiments are given in the dependent claims and discussed in the following.

The means may be at least one flexible or moveable wall at least partly defining the interior cavity. The flexible or moveable wall can flex or move to change the volume of the interior cavity to accommodate volume changes in the liquid contained in the vial due to temperature change.

Preferably, the sealing cap defines a flexible wall of the interior cavity that flexes inwardly or outwardly relative to the interior cavity to increase or decrease the volume of the interior cavity.

In one form, the sealing cap may include a cavity extending therethrough to provide an opening into the interior cavity of the vial. The flexible wall is provided by a flexible member covering the opening extending through the cap. The flexible member may protrude into the cavity extending through the cap. The flexible member seals the cavity from the liquid and is mounted to flex within the cavity.

In an alternative form, the sealing cap itself is a flexible sheet-like member sealingly closing the first opening into the interior cavity of the vial. Preferably, the sheet-like cap is attached to an outer wall of the vial defining the first opening. One example flexible sheet is a multilayered aluminium film. The sheet-like cap is in contact with the liquid contained by the vial. The flexible sheet-like cap can flex inwardly or outwardly to change the volume of the interior cavity.

Preferably, the vial comprises a body wall extending between opposed end walls, the body and the opposed end walls providing walls defining the interior cavity.

In one preferred embodiment, an end wall, which may not necessarily be part of the sealing cap as in the above embodiment, is made of a flexible material that flexes outwardly or inwardly in response to an increase in the pressure in the liquid.

The body wall may include at least a portion that is made of a flexible material that flexes outwardly or inwardly. Thus, the vial may include a flexible body wall portion and a rigid body wall portion. The flexible portion may define the first opening. In this way, the first opening is able to accommodate an engraving tool if the interior cavity is formed with such.

In a yet further embodiment, substantially the entire wall of the body of the interior cavity is made of a flexible material, which again provides outward or inward flexing.

Thus, at least part of a wall defining the interior cavity of the vial may be made of a flexible material having a similar thermal expansion coefficient as the liquid contained in the vial. This will allow the wall to expand or contract with the liquid and thus accommodate the volume change of the liquid.

In another preferred embodiment, an end wall of the interior cavity includes a piston slideably mounted so as to change the volume of the interior cavity in response to pressure changes in the liquid. The sealing cap may comprise a cavity opening into the interior cavity of the vial. In this case, the piston may be slideably mounted in the cavity in the sealing cap and seals the cavity in the sealing cap from the interior cavity of the vial. A gas, e.g. air, may be contained in the cavity by the piston. The piston is preferably biased to a predetermined position. For example, a spring may be mounted between an inward wall of the cavity and the piston, which biases the piston back to the predetermined position. The piston may, in an alternative form, may be separate from the sealing cap and be slideably mounted in the interior cavity itself.

The means for changing the volumetric liquid changing capacity of the interior cavity may alternatively or additionally be at least one compressible member, the volume of which is changeable according to volume changes in the liquid so as to accommodate any expansion or contraction of the liquid contained in the vial. In this way, pressure changes in the liquid are compensated for by allowing a volume change in the liquid.

Preferably, the compressible member contains gas sealed from the liquid in the interior cavity. In one form, the compressible member may be a balloon, which is at least partly filled with the gas. The volume of the balloon is responsive to accommodate volume changes in the liquid contained by the vial and thus changes the volumetric capacity of the interior cavity.

Alternatively, the compressible member can comprise a sponge having an outer membrane sealing the sponge from the liquid. In yet another alternative, the compressible member may comprise a sponge including cells containing gas and sealed from the liquid. The compressible member may be an interior wall of the interior cavity, preferably an interior side of the sealing cap, so that it is in contact with the liquid to allow it to accommodate volume changes therein.

The vial may be formed into a first and second chamber in liquid communication with one another by a narrow passageway. The second chamber, which is preferably a smaller chamber, comprises the means for changing the volumetric liquid containing capacity of the interior cavity.

The interior cavity is preferably generally barrel shaped, the barrel being longitudinally oriented with respect to the generally elongate vial. Thus, the interior cavity preferably includes opposed end regions and a central region. The wall of the cavity curves from its smallest diameter at the opposed end regions to its largest diameter in the central region. The barrel shape is preferably formed with an engraving tool (e.g., CNC—Computer Numerical Control). The engraving tool is introduced through the first opening. The vial may, however, be manufactured by extrusion.

The vial may comprise a second opening into the interior cavity for introducing the liquid into the vial. The second opening may be provided at an opposed end of the elongate vial to the first opening. The second opening may be narrower than the first opening. The second opening is airlessly sealed with a second cap. Alternatively, the vial may include just one opening for introduction of the liquid and optionally also for receiving the engraving tool when the interior cavity is formed by engraving.

In one preferred embodiment, a first sealing cap and a second sealing cap together seal the first opening. The interior cavity is shaped by the engraving tool extending through the first opening. The first sealing cap is sealingly attached to the first opening after the engraving is completed. The first sealing cap defines a passage through it into the interior cavity of the vial. The passage is for introducing liquid into the vial. After the vial is filled with the liquid, the second sealing cap is sealingly attached to the first sealing cap so as to close the passage and seal the first opening into the interior cavity.

The first sealing cap and, if there is one, the second sealing cap are preferably made from a weldable material that can be welded to the vial openings. Ultrasonically weldable materials are preferred.

The vial of the invention is preferably used as a spirit level vial wherein the vial is filled with at least two liquids, preferably having different densities and noticeably different colours. A second liquid is provided as a liquid globule and a first liquid provides a liquid medium within which the liquid globule is free to move depending upon the spatial orientation of the spirit level vial. The vial is transparent.

In a second aspect of the invention, a spirit level is provided, which comprises the spirit level vial mentioned above. It also includes a base element to which the spirit level vial is mounted. The spirit level includes at least one marking indicating, when the globule is aligned with it, that the base element is level.

BRIEF DESCRIPTION OF THE DRAWINGS

Exemplary embodiments of the invention are described in the following, with reference to the drawings.

FIG. 1 shows an airlessly sealed vial according to a first embodiment of the invention.

FIG. 2 shows an airlessly sealed vial according to a second embodiment of the invention.

FIGS. 3A to 3C show an airlessly sealed vial according to a third embodiment of the invention.

FIG. 4 shows an airlessly sealed vial according to a fourth embodiment of the invention.

DETAILED DESCRIPTION OF THE PREFERRED EMBODIMENTS

Figure 5:
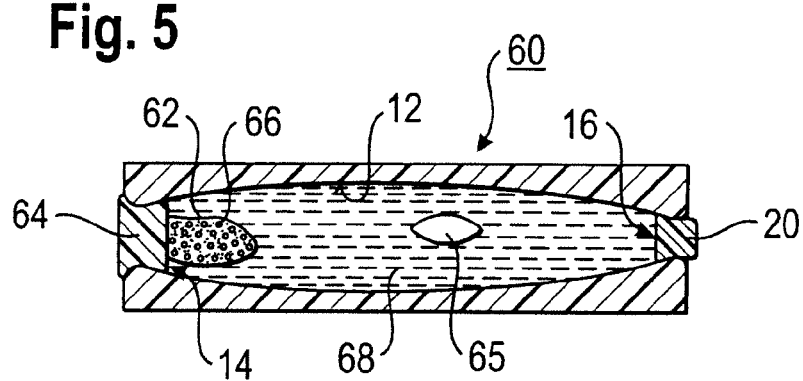
FIG. 5 shows an airlessly sealed vial according to a fifth embodiment of the invention.

According to the embodiment shown in FIG. 1, a vial 10 is provided and includes an interior cavity 12 defined by a rigid peripheral body wall with a generally cylindrical outer surface and opposed first and second sealing caps 18, 20. The vial can alternatively provide, for example a polygonal, outer surface.

The interior cavity 12 is generally barrel shaped, that is the interior cavity 12 curves from its greatest diameter in a central region to a narrower diameter at or adjacent either end. The vial 10 shown is elongate and the barrel is longitudinally oriented.

The vial 10 has a first opening 14 at one end and a second, more slender, opening 16 at the other end. First and second sealing caps 18, 20 are shown, which are configured to close the first and second openings 14, 16 to define the ends of the interior cavity 12.

In a sealed configuration (not shown in FIG. 1), a first sealing cap 18 is attached to the first opening 14 in a sealing manner and a second sealing cap 20 is attached to the second opening 16 in a sealing manner. The interior cavity 12 is thus defined by a longitudinal body wall extending between opposed end walls, which include the inward faces of the sealing caps 18, 20. The interior cavity 12 of the vial 10 is filled with liquid and escape of the liquid from the interior cavity 12 is prevented by the sealing caps 18, 20. The vial 10 is thus sealed.

The vial 10 may be made from a plastic material, such as PMMA (polymethylmethacrylate) or PET (polyethylene terephthalate). These materials are particularly suitable when the vial 10 is used in a spirit level as they are suitably transparent so liquid contained in the vial 10 can be seen through its walls. The sealing caps 18, 20 can be made from similar materials. The first and second sealing caps 18, 20 should be made from a weldable material for welding, ultrasonic welding for example, to the respective first and second openings 14, 16. PMMA meets the weldability requirement, as does ABS (acrylonitrile-butadiene-styrene) plastic.

The form of the interior cavity 12, e.g. barrel shaped, is made by engraving, for example CNC turning. The first opening 14 serves to receive an engraving tool. Once the engraving is completed, the first opening is sealed shut by welding the first sealing cap 18 thereto. The second opening 20 serves to receive an instrument for filing the interior cavity 12 with one or more liquids. After the interior cavity 12 is filled, the second sealing opening 16 is sealed shut by welding the second sealing cap 20 thereto.

It is possible to construct the vial 10 with just a first opening 14 and excluding the second opening 16. The first opening 14 could be used for receipt of both the engraving tool and the instrument for filling the interior cavity 12 with the liquid. The airless seal of the vial 10 is more difficult to achieve with such a construction. A solution to this difficulty is discussed below with respect to the fifth embodiment. Briefly and with reference to FIG. 4, the first opening 14 is used to receive the engraving tool and after this a first sealing cap 51 is sealingly attached to the first opening 14. The first sealing cap 51 includes a passage 57 therethrough for receiving an instrument for introducing liquids into the interior cavity 52. A second sealing cap 54 sealingly closes the passage 57 in the first sealing cap 51, thereby, and together with the first sealing cap 51, sealingly closing the first opening 14.

Instead of engraving, an extrusion process can manufacture the vial 10.

The interior cavity 12 can have a volume of 2 cc for example.

In the case of use of the vial 10 in a spirit level encasing, the interior cavity can, for example, be filled with 1.7 cc of a high density first liquid and 0.3 cc of a low density second liquid. Other proportions may be used such as 1.5 cc of the first liquid and 0.5 cc of the second liquid.

The first or major liquid can, for example, be a halogenated liquid. Alternatively, the first liquid may be 1,4 dichlorobutane. The second or minor liquid can, for example, be a water/anti-freeze liquid mixture (mixed for example in a 50:50 ratio) to which an aqueous dye has been added to provide a sufficiently strong contrast between the major and minor liquids. As examples, the anti-freeze liquid may be methanol and the aqueous dye may be a food dye. The minor liquid provides a globule that moves within the medium provided by the major liquid. Alignment of the globule with one or more markings on the spirit level indicates that the spirit level is level.

With reference to FIG. 1, the means for accommodating changes in the volume of the liquid according to a first embodiment of the present invention will now be discussed.

The sealing cap 18 includes a central cavity 24/26 extending through it. The central cavity 24/26 is defined by a peripheral portion of the sealing cap 18. A relatively flexible member 22 made of polymer material extends across an inward (relative to the interior cavity 12) face of the sealing cap 18. The flexible member extends into the central cavity 26 in the sealing cap 18 towards an outward face of the sealing cap 18. Thus, the flexible member 22 has a tip protruding into the central cavity 26 from the inward face of the sealing cap 18.

The flexible member 22 may be made of a low shore rubber, such as 10 to 20 shore. A soft rubber such as natural rubber may be appropriate. Other materials fulfilling the flexibility purpose may be employed.

In use, the flexible member 22 can flex from a more inward position to a more outward position to increase the volume of the interior cavity 12 of the vial 10 to thereby accommodate volume change in the liquid contained in the vial 10.

A second embodiment of the present invention is shown in FIG. 2. Like parts of the second embodiment are labelled with the same reference numerals as corresponding parts in the first embodiment. Only the different features of the second embodiment will be discussed in the following.

A sealing cap 30 is shown, which includes means for accommodating changes in volume in the liquid contained in the vial 10 according to the second embodiment. The means is a balloon like structure 32 containing air and is attached to an inward face of the first sealing cap 30. Other gases may be contained in the balloon like structure 32.

In use, the balloon like structure will be compressed or expanded to accommodate changes in the volume of the liquid contained in the vial 10, thereby changing the volume of liquid that can be contained in the interior cavity 12 and providing a compensation effect reducing strain on the wall of the vial 10.

A third embodiment of the present invention is shown in FIGS. 3A to 3C. Like parts of the third embodiment are labelled with the same reference numerals as corresponding parts in the first and second embodiments. Only the different features of the third embodiment will be discussed in the following.

Means for accommodating changes in the volume of liquid contained in the vial 10 according to the third embodiment is provided in the form of a flexible sheet 40. The first opening 14 of the vial 10 is sealed closed by the flexible sheet 40, which thus acts as an end cap. The flexible sheet 40 is sealingly attached about the outer periphery of the first opening 14.

The flexible sheet 40 may be made of a polymer material or an aluminium film, such as a multilayered aluminium film.

In use, an increase in the volume in the liquids contained in the interior cavity 12 due to temperature increase is accommodated by the flexible sheet 40 flexing outwardly. Without the increase in capacity of the vial 10, the pressure would increase in the liquids, which would strain the vial. The strain on the vial is thus reduced by the claimed solution. A similar discussion is applicable to a decrease in temperature, where the flexible sheet 40 can flex inwards to reduce the volume of the vial 10 and thus accommodate any volume reduction of the liquid.

A fourth embodiment of the present invention is shown in FIG. 4.

The embodiment of FIG. 4 provides a vial 50 with just one opening 14 into the interior cavity 52. The other end of the vial 50 is closed by an end face, which is an extension of the wall defining a body portion of the vial 50.

A first sealing cap 51 is provided that sealingly fits into the first opening 14. The first sealing cap 51 includes a central opening 57 extending therethrough into which a second sealing cap 54 sealingly fits in order to seal the first opening 14 closed.

The vial includes a rigid portion 56 made from a rigid material and a flexible portion 58 made from a flexible material. The flexible portion 58 provides means for accommodating volume changes in the liquid contained in the interior cavity 52 of the vial 50.

The majority of the vial is made from the rigid material and thus the rigid portion 56 forms a major portion of the vial 50. The rigid portion 56 of the vial 50 includes an end of the vial opposed to the first opening 14. The flexible portion 58 forms a portion adjacent to and including the end of the vial 50. The flexible portion 58 defines the first opening 14 to the interior cavity 12.

The flexible portion may be made of a material having a similar expansion coefficient as the liquid contained by the vial 50.

In use, a volume increase or decrease in the liquid contained in the vial 50 is accommodated by the flexible portion 58 flexing to increase or decrease the volume of the interior cavity 12, thereby providing a volume change accommodation effect.

The engraving tool is inserted though the first opening 14 in the end of the vial 10 defined by the flexible portion 58. The first opening 14 will thus flex to some extent to accommodate the engraving tool. The flexible portion 58 has a limited extent as compared to the rigid portion 56 to ensure that the engraving tool only operates on the rigid portion 56.

After engraving of the interior cavity 52 is completed, a first cap 51 is welded to the first opening 14. The first cap 51 has an axial passage 57 extending therethrough. The axial passage is sized to receive an instrument for filling the interior cavity 52 with liquid. Once the interior cavity 52 is filled, a second cap 54 is welded to the first cap 51, which sealingly closes the axial passage 57 and the first opening 14.

Even with the first and second caps 51, 54 sealing the first opening 14 closed, the flexible portion 58 is still able to bow outwardly and flex inwardly to allow the volume of the liquids to increase or decrease, respectively, in the liquid.

In an embodiment related to the fourth embodiment, substantially the whole of the vial wall defining the interior cavity is made from a flexible material having a similar expansion coefficient as the liquid being contained by the vial. Thus, the volume of the interior cavity is changed to accommodate volume changes in the liquid.

A fifth embodiment of the present invention is shown in FIG. 5. Like parts of the fifth embodiment are labelled with the same reference numerals as corresponding parts in the first, second, third and fourth embodiments. Only the different features of the fifth embodiment will be discussed in the following.

FIG. 5 shows an airlessly sealed vial 60, meaning that the vial is in the sealed configuration.

The vial 60 has its opposed first and second openings 14, 16, respectively sealed closed by first and second sealing caps 64, 20. The interior cavity 12 of the sealed vial 60 is filled with a first liquid 68 and a globule of a second liquid 65, which are prevented from escaping by the wall of the vial including an interior side of the sealing caps 64, 20 sealing the first and second openings 14, 16 closed.

The first liquid 68 takes up a major portion of the volume of the interior cavity 12 and the second liquid globule 65 takes up a minor portion of the volume of the cavity 12. The first liquid 68 and the globule 65 are of different colours, so they can be readily differentiated by a user, and of different densities, so they do not mix, as discussed above.

Means for accommodating volume changes in the liquids 68, 65 due to changes in temperature of the liquids is included. The means is in the form a sealed sponge 62. The sealed sponge 62 includes numerous cells 66. The cells 66 contain gas, e.g. air. The sponge 62 may be natural sponge, or more preferably a synthetic sponge such as polyurethane, rubber or silicon foam. The sponge 62 includes a liquid proof surface to stop the intake of the liquids 68, 65 by the sponge 62. This can be formed by dipping the sponge into a non-permeable coating such as a butyl rubber coating. The cells 66 allow the sponge 62 to readily compress and expand under pressure and the sponge 62 is also suitably resilient to revert to its unstressed state upon removal of the pressure.

The sponge 62 is shown as mounted to an interior side of the first sealing cap 64.

In use, the sponge 62 will expand or compress to accommodate volume changes in the liquids 68, 65.

The globule 65 provides an indicator as to when the airlessly sealed vial 60 is in a predetermined spatial orientation. When the globule 65 moves to a pre-selected position, the user can readily identify this and make a determination that the airlessly sealed vial 60 is in the predetermined spatial orientation.

Alternative forms of the compressible member 62 may be provided. For example, the member 62 may be attached to the interior wall of the interior cavity 12, preferably an inward side of the sealing cap 64. The compressible member 62 may be a sealed or closed cell sponge or rubber or plastic foam. The cells 66 thus do not permit intake of the liquid contained by the vial. The cells 66 may contain gas, for example air, which permit compression. The cells do not need to be sealed, and the sponge as a whole may be, as described in the above given embodiment.

Figure 6:
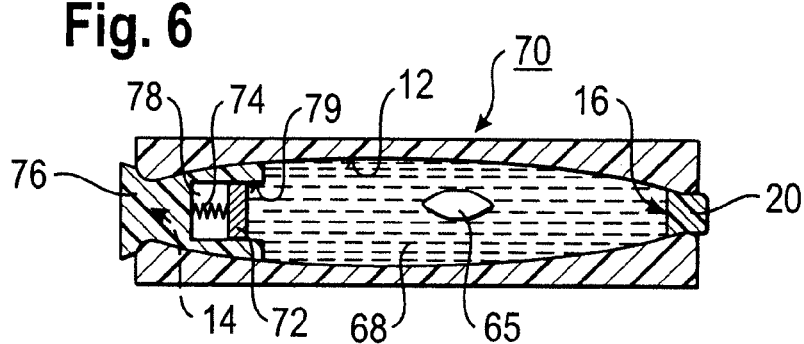
FIG. 6 shows an airlessly sealed vial according to a sixth embodiment of the invention.

A sixth embodiment of the present invention is shown in FIG. 6. Like parts of the sixth embodiment are labelled with the same reference numerals as corresponding parts in the earlier embodiments. Only the different features of the sixth embodiment will be discussed in the following.

An airlessly sealed vial 70 includes means for accommodating volume changes in the liquids contained in the vial 70. The first sealing cap 76 includes a cap cavity 78 buried into the first sealing cap 76 and open to the interior cavity 12 of the vial 70. The cap cavity 78 includes an opening 79 to the interior cavity 12 of the vial 70 and includes an inward end face. A piston 72 is disposed in the cap cavity 78 and is sealingly engaged by an axially extending wall of the cap cavity 78. The cap cavity 78 is filled with a gas, e.g. air, which is prevented from entering the interior cavity 12 of the vial 70 by the sealing engagement of the piston 72 with the cap cavity 78. The piston 72 is moveable within the cap cavity 78 between the inward end face and the opening 79 to the interior cavity 12 of the vial 70.

The piston 72 is biased by a spring 74 to a pre-selected position in the cap cavity 78 to provide a resiliency to the movement of the piston 72. The spring 74 is attached to the outward face of the cap cavity 78 and an outward face of the piston 72 (outward is defined with respect to the interior cavity 12 of the vial 70) and extends therebetween.

In use, a volume increase in the liquid contained by the vial 70 is allowed by the piston 72 being forced back against the spring 74, thereby increasing the volume of the interior cavity 12. A volume decrease in the liquid is allowed by an inward displacement of the piston 72, thereby decreasing the volume of the interior cavity 12. The spring 74 is adapted to prevent the piston 72 moving beyond the cap opening 79 to the interior cavity 12 of the vial 70, which would break the seal between the cap cavity 78 and the interior cavity 12.

Figure 7:
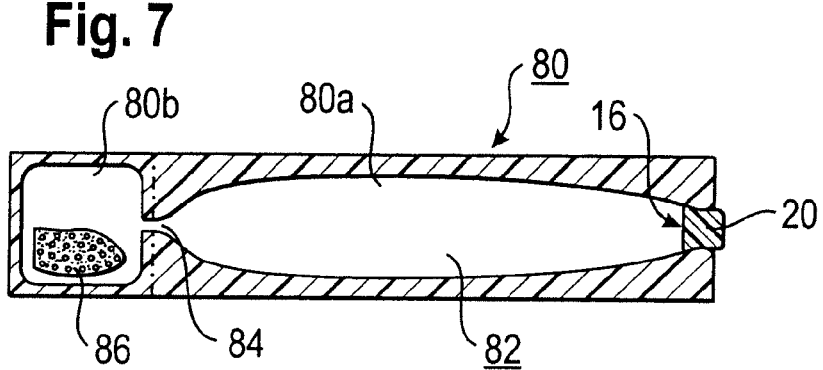
FIG. 7 shows an airlessly sealed vial according to a seventh embodiment of the invention.

A seventh embodiment of the present invention is shown in FIG. 7. Like parts of the seventh embodiment are labelled with the same reference numerals as corresponding parts in the previous embodiments. Only the different features of the seventh embodiment will be discussed in the following.

The airlessly filled vial 80 includes an interior cavity 82 that is filled with one or more liquids. The interior cavity 82 comprises a primary chamber 80a and a secondary chamber 80b that are in liquid communication with one another through a narrow passageway 84. The secondary chamber 80b contains a minor amount of the liquid contained in the interior cavity 82 and the primary chamber 80a contains a major amount of the liquid contained in the interior cavity 82.

Means for allowing changes in volume in the liquid is placed in the secondary chamber 80b. The means is a compressible sponge 86 similar to the one discussed in relation to the fifth embodiment. The compressible sponge 86 is too large to pass through the narrow passageway 84. The compressible sponge 86 is not attached to the secondary chamber 80b in this exemplary embodiment.

In use, the sponge 86 in the secondary chamber 86 will compress or expand to accommodate changes in volume in the liquid brought about by an environmental temperature change. The first liquid will, in turn, pass through the narrow passageway 84 between the primary and secondary chambers 80a, 80b. Thus, compressible element 86 reacts to allow the volume changes, rather than the liquid pressure increasing or decreasing, thereby reducing any strain on the vial 80.

In related embodiments to the seventh embodiment, the secondary chamber may be provided with other volume change accommodation means, such as the piston of the seventh embodiment, the balloon of the third embodiment, the flexible wall of the fifth embodiment or the other forms of the compressible member discussed in relation to the sixth embodiment.

Figure 8:
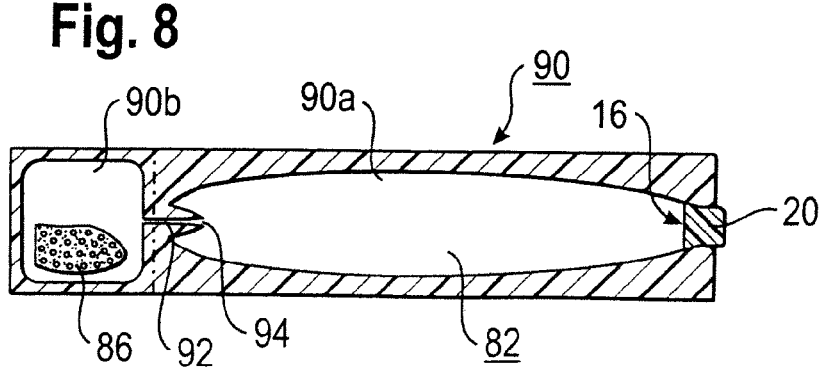
FIG. 8 shows an alternative form of the airlessly sealed vial according the seventh embodiment.

The narrow passageway is sized to be smaller than a globule of second liquid in a first liquid in the primary chamber 80b, such as globule 65 shown in FIGS. 6 and 7. In FIG. 9, a modification of the seventh embodiment is shown. This embodiment differs from that shown in FIG. 8 in that the wall defining the narrow passageway 92 between the primary and secondary chambers 80a, 80b extends inwardly into the primary chamber 90a. In this way, a curved mound like projection is provided with a narrow axial passageway 92 with an entrance 94 extending therethrough and into the secondary chamber 90b.

In use, the curved mound-like extension into the primary chamber 90a will reduce the possibility of bursting a globule of second liquid provided in a first liquid medium.

Vials 80 and 90 may be filled via opening 16, which is sealingly closed by sealing cap 20.

The above examples are to illustrate envisaged advantageous embodiments of the invention. The scope of the invention should, however, not be limited to such exemplary embodiments and is defined by the claims.

The disclosure of WO 2004/044524 A2 is incorporated herein by reference with regard to any features mentioned both in this document and herein.

The invention claimed is:

1. An airlessly sealed vial, comprising:
   an interior cavity filled with at least one liquid;
   at least one sealing cap sealingly closing an opening into the interior cavity; and
   means associated with the sealing cap and/or the interior cavity for changing the volumetric liquid containing capacity of the interior cavity in accordance with volumetric changes in the liquid contained in the vial.

2. The airlessly sealed vial of claim 1, comprising at least one flexible or moveable wall at least partly defining the interior cavity that can flex or move to change the volume of the interior cavity.

3. The airlessly sealed vial of claim 1, wherein the sealing cap includes a cavity extending therethrough to provide an opening into the interior cavity of the vial and includes a flexible wall covering the opening extending through the cap, wherein the flexible wall can flex to change the volume of the interior cavity.

4. The airlessly sealed vial of claim 3, wherein the flexible wall protrudes into the cavity extending through the cap.

5. The airlessly sealed vial of claim 1, wherein the sealing cap itself provides a flexible wall sealingly closing the first opening into the interior cavity of the vial to flex to change the volume of the interior cavity, wherein the flexible sealing cap is attached to an outer wall of the vial defining the first opening to seal the first opening.

6. The airlessly sealed vial of any of claim 1, wherein a wall defining a longitudinal side of the interior cavity includes at least one rigid portion made of a relatively rigid material and at least one flexible portion made of a relatively flexible material to flex to change the volume of the interior cavity and wherein the flexible material defines the first opening.

7. The airlessly sealed vial of any of claim 2, wherein at least part of a wall defining the interior cavity of the vial is made of a flexible material that has a similar thermal expansion coefficient as the liquid contained in the vial.

8. The airlessly sealed vial of claim 1, wherein the sealing cap comprises a cavity opening into the interior cavity of the vial, wherein a piston is slideably mounted in the cavity in the sealing cap, wherein the piston is moveable to change the volume of the interior cavity of the vial, and wherein the piston seals gas contained in the cavity in the sealing cap from the interior cavity of the vial.

9. The airlessly sealed vial of claim 8, wherein the piston is biased to a predetermined position by a spring mounted between the piston and an inward face of the cavity in the sealing cap.

10. The airlessly sealed vial of claim 1, wherein the interior cavity comprises at least one compressible member attached an interior wall of the interior cavity, wherein the volume of the compressible member is changeable to change the volumetric liquid containing capacity of the interior cavity.

11. The airlessly sealed vial of claim 1, wherein the interior cavity comprises at least one balloon to change its volume to change the volumetric liquid containing capacity of the interior cavity, wherein the balloon is attached to an interior wall of the interior cavity.

12. The airlessly sealed vial of claim 1, wherein the interior cavity comprises a sponge, the cells of which contain gas and are sealed from the liquid, wherein the volume of the sponge is changeable to change the volumetric liquid containing capacity of the interior cavity.

13. The airlessly sealed vial of claim 1, wherein the interior cavity is divided into a first and a second chamber in liquid communication with one another by a narrow passageway, wherein the second chamber comprises the means for changing the volumetric liquid containing capacity of the interior cavity.

14. The airlessly sealed vial of claim 1, wherein the interior cavity is barrel shaped.

15. The airlessly sealed vial of claim 1, wherein the sealing cap is welded to the opening.

16. The airlessly sealed vial of claim 1, comprising a first opening into the interior cavity for introduction of an engraving tool and a second opening into the interior cavity for introduction of an instrument for filling the interior cavity with liquid, wherein the first and second cavities are sealingly closed with respective first and second sealing caps.

17. The airlessly sealed vial of claim 1, wherein the opening is sealingly closed by a first and a second sealing cap, wherein the opening into the interior cavity is for introduction of an engraving tool and the first sealing cap is sealingly attached to the opening, wherein the first sealing cap includes a passage extending through it, wherein the passage is for introduction of an instrument for filling the interior cavity and wherein the second sealing cap sealingly closes the passage.

18. The airlessly sealed vial of claim 1, wherein the interior cavity is filled with a first liquid and a second liquid, wherein the second liquid is a globule and the first liquid provides a medium within which the globule moves depending on the spatial orientation of the vial, wherein the first liquid and the second liquid are of different densities so that they do not mix, the vial is transparent and the first and second liquids are distinctly different colours so they can be differentiated by a person viewing them through the vial.

19. A spirit level comprising:
a base element;
the airlessly sealed vial of claim 18 mounted to the base element;
and at least one marking to indicate, when the globule is aligned with the marking, that the base element is level.

* * * * *